Jan. 23, 1951     W. L. MEIER     2,539,371

FRICTION GENERATOR

Filed March 3, 1950

HYDROCARBON PLASTIC
OR
GLASS

MERCURY AMALGAM

INVENTOR.

Wilber L. Meier

Patented Jan. 23, 1951

2,539,371

UNITED STATES PATENT OFFICE 2,539,371

FRICTION GENERATOR

Wilber L. Meier, Chatham, N. J.

Application March 3, 1950, Serial No. 147,484

8 Claims. (Cl. 171—328)

This invention relates to friction generators, and has particular reference to generators which reverse their polarity when the direction of rotation is reversed.

Friction generators are quite old in the art of generation of electricity and were among the first mechanical appliances to be used in connection with the early experiments on electrical phenomena. Some of the first generators used a sphere of sulphur rubbing against a cloth. Others used ebonite and glass in various forms rubbing against pads of silk, leather and felt. One of the most efficient friction generators used a rotating glass disk or cylinder with leather pads pressing against the disk surface. An amalgam of tin, zinc and mercury was spread on the leather surface to increase the available current.

All the above generators produced electricity of a predetermined polarity which was not dependent upon the direction of rotation of the moving member. Such generators were employed to demonstrate physical phenomena, generally in the class room, and had little or no practical application. However, during recent years, small high voltage generators have been used to charge instruments used for the detection and measurement of nuclear radiation. In this connection it is necessary to charge the instrument to a definite voltage, and if an overcharge is inadvertently applied, the instrument must be discharged and the process repeated.

One of the objects of this invention is to provide an improved friction generator which avoids one or more of the disadvantages and limitations of prior art arrangements.

Another object of the invention is to provide an electrostatic friction generator which changes polarity when the direction of rotation is changed.

Still another object of the invention is to provide a generator small in size and inexpensive to manufacture for charging measuring instruments and for giving the initial charge to influence-type high voltage generators.

The friction generator in accordance with my invention includes a rotor of insulating material made in the form of a flat disk. Resiliently pressed against one edge of the disk are two pads of material, sometimes in a fibrous, matted arrangement such as felt. Adjacent to each pad and in contact therewith is a brush comprising a conducting strip which makes contact with a considerable area of the edge of the disk. Some means is provided for turning the rotor, either by hand or by some mechanical means. Provision must be made to turn the rotor in both directions if reversed polarity is desired.

For a better understanding of the present invention, together with other and further objects thereof, reference is made to the following description taken in connection with the accompanying drawings.

Figure 1:
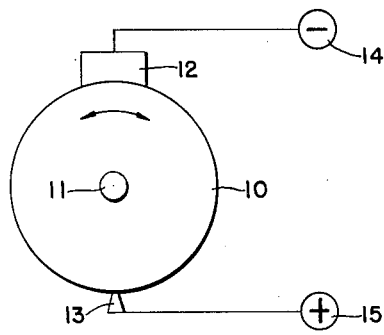
Fig. 1 is a schematic representation of a conventional prior art generator in which the rubbing pad is one of the electrodes.

Referring now to Fig. 1, a prior art generator is shown to illustrate the improvements and differences between the known types of machines and the present invention. The prior art generator of Fig. 1, comprises a rotor 10, which in this example is a flat disk, rotatable about a shaft 11. A friction pad 12 is resiliently held against the rotor 10 and when the rotor is turned, electrical charges are created on the edge of the insulated disk due to the rubbing action. The charges may be taken off by a brush 13 which may touch the disk surface in generators which develop low voltages. In generators which develop a voltage exceeding 5,000 volts or more a spray brush, comprising a plurality of fine sharp points, may be used without making actual contact with the rotor surface.

One of the generator terminals 14 is connected to the friction pad 12 which may be positive or negative, depending upon the materials used. The second terminal 15 is connected to the brush 13.

Due to the symmetrical nature of the structure, it will be obvious that a change in direction of the rotor will have no effect on the polarity of the generated voltage.

Figure 2:
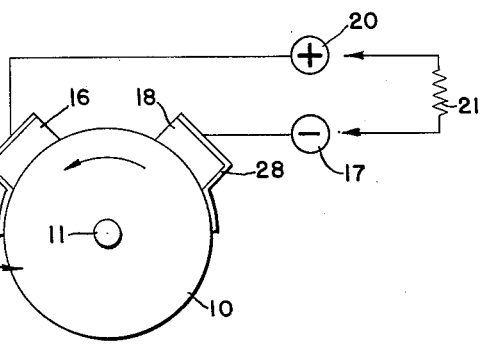
Fig. 2 is a schematic representation of the reversible friction generator showing only the essential components.

Fig. 2 illustrates a schematic representation of the invention. Two pads 16 and 18 are resiliently held against a rotating disk 10 made of insulating material such as glass rotatably mounted on shaft 11. In contact with each pad and extending over a considerable area of the rotor edge are two conducting electrodes 27 and 28, The electrodes act as brushes and collect the charges from the rotor and apply them to the top portion of the pads.

When the rotor is turned counterclockwise as indicated by the arrow of Fig. 2 charges generated on the surface of the rotor 10 as a result of friction between the rotor and the pad 18 are carried by the motion of the rotor to pad 16 and thus to the terminal 20. The charges generated by pad 16 rubbing on the rotor are carried by the motion of the rotor to the conducting brush 27 where the charges generated on the rotor surface by pad 16 are collected and returned to pad 16 where the opposite charges generated on the pad 16 are neutralized. Thus the only charges allowed to flow to terminal 20 are those generated as a result of pad 18 rubbing on the rotor.

In a similar manner, when the rotor is turned clockwise only those charges generated by pad 16 are allowed to flow to terminal 17. If the same material is used for pad 16 and pad 18 the terminal 17 will now be positively charged. Thus the reversal of the direction of rotation reverses the polarity of the terminals. It is desirable that the conducting brushes 27 and 28 make good contact with the surface of the rotor.

The pads 16 and 18 are shown in Fig. 2 disposed at an angle of 90° from each other. This appears to be the optimum arrangement when both electrical and structural requirements are taken into account. However, tests made on an experimental model have shown that the pads and brushes may be spaced around the periphery in any convenient location without affecting the voltage or current output. It will be obvious that the brushes should not touch each other and that the sequential arrangement of brushes and pads be maintained as illustrated in Fig. 2.

Figure 5:
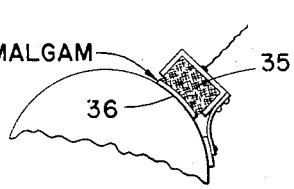
Fig. 5 is a partial cross section, similar to Fig. 4, indicating the arrangement used for alternate materials.

When the rotor in the above described generator is made of glass and the pad comprises a thick wad of felt or leather 35 (Fig. 5) on which an amalgam of mercury, tin, zinc, or thallium 36 has been spread, a voltage of about 10,000 volts is generated between the terminals 17—20 when the shaft is rotated at a speed of two revolutions per second. The accumulated charges which are collected by brushes 27 and 28 may be used to charge a condenser, charge a radiation dosimeter, or slowly discharge through a connected resistor 21, in which case the generator may be classified as a direct current generator.

Figure 3:
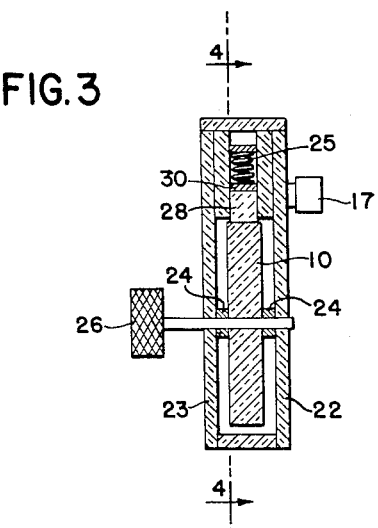
Fig. 3 is a cross sectional view of one form of the friction generator taken on a line through one of the brushes.
Figure 4:
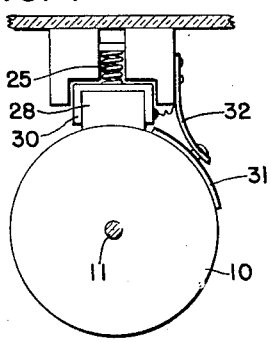
Fig. 4 is a partial cross sectional view taken along line 4—4 of Fig. 3, some of the parts being omitted.

Figs. 3 and 4 illustrate the manner in which the reversible generator may be made into a small manually driven machine to charge an instrument for detection of nuclear radiation. Fig. 3 is a cross sectional view of one form of the generator taken on a line which bisects the center of the rotor and one of the friction pads 28. A case comprising non-conducting side walls 22 and 23 encloses the rotor 10 on shaft 11 driven by a knurled knob 26. Spacers 24 keep the rotor in alignment. The friction pad 28 is resiliently held against the edge of the rotor 10 by a spring 25 pressing against a conducting pad holder 30.

Fig. 4 shows the pad holder 30 in greater detail and also shows how a collector brush 31 is resiliently held against the edge of the rotor by a flat spring 32. The pad holder 30 and the brush 31 are electrically connected to each other and to the output terminal 17.

It has been found that metal brushes and pad holders are not necessary for the operation of the generator. Brushes of carbon or graphite or insulating materials with a coating of graphite or other conducting material may be used.

The friction pads 27 and 28 may be made of any substance which produces a charge when the rotor 10 is turned. Pads made of cotton, fibrous nylon or silk work well with a rotor of glass or methyl-methacrylate. However, the working range of these materials is limited to a temperature higher than −10 degrees centigrade. In order to produce a generator that is not affected by humidity and freezing, many substances have been tested and it has been found that an amalgam of mercury and another metal or mixture of other metals such as tin, zinc, lead or thallium can be used in a perfectly dry atmosphere and withstand a wide temperature range without affecting their electrical properties. In particular, an amalgam of 90% mercury and 10% thallium by weight has been found to operate well between a temperature range −58° C. and +70° C. These materials are used in conjunction with a rotor of glass or other insulating material.

When a manually operated generator is used to charge a radiation sensitive instrument, the knob 26 is turned slowly in one direction while observing the charge indicator. When the indicator shows that the required charge has been applied the motion is stopped and the generator disconnected. If an overcharge is inadvertently applied it is only necessary to turn the rotor in the opposite direction to reduce the charge to the correct amount.

While there have been described and illustrated specific embodiments of the invention, it will be obvious that various changes and modifications may be made therein without departing from the field of the invention which should be limited only by the scope of the appended claims.

I claim:

1. A friction generator comprising, a rotor made of insulating material, two pads resiliently pressed into contact with the rotor, two brushes for collecting generated electrical charges from the rotor, each of said brushes mounted adjacent to one of the pads in reversed position and each comprising a conductor in contact with the rotor and in contact with the adjacent pad, and means for turning the rotor in either direction.

2. A friction generator comprising, a rotor made of insulating material, two pads resiliently pressed into contact with the rotor, two brushes for collecting generated electrical charges from the rotor, each of said brushes mounted adjacent to one of the pads in reversed position and each comprising a conductor in contact with the rotor and in contact with the adjacent pad, and means for turning the rotor in either direction to provide electrical potentials at the brushes, the polarity of which depends upon the direction of rotation of the rotor.

3. A friction generator comprising, a rotor made of insulating material in the form of a flat disk, two pads resiliently pressed into contact with the rotor, two brushes for collecting generated electrical charges from the rotor and making them available to a load circuit, each of said brushes mounted adjacent to one of the pads in reversed position and each comprising a conductor in contact with the rotor and in contact with the adjacent pad, and means for turning the rotor in either direction to provide electrical potentials at the brushes, the polarity of which depends upon the direction of rotation of the rotor.

4. A friction generator comprising, a rotor made of insulating material in the form of a flat disk mounted for rotation, two pads having a fibrous structure resiliently pressed into contact with the rotor disk, two brushes for collecting generated electrical charges from the rotor disk and making them available to a load circuit, each of said brushes mounted adjacent to one of the pads in reversed position and each comprising a conductor in contact with the rotor disk and in contact with the adjacent pad, and means for turning the rotor in either direction to provide electrical potentials at the brushes, the polarity of which depends upon the direction of rotation of the rotor.

5. A friction generator comprising, a rotor made of insulating material in the form of a flat disk mounted for rotation, two pads having a fibrous structure resiliently pressed into contact with the rotor disk, two brushes for collecting generated electrical charges from the rotor disk and making them available to a load circuit, each of said brushes mounted adjacent to one of the pads in reversed position and each comprising a conductor in resilient contact with the rotor disk, electrical connecting means for joining each brush to its adjacent pad, and means for turning the rotor in either direction to provide electrical potentials at the brushes, the polarity of which depends upon the direction of rotation of the rotor.

6. A friction generator comprising, a base member for securing non-rotating components, a rotor made of insulating material in the form of a flat disk and rotatably mounted on the base, two pads mounted on the base and resiliently pressed into contact with the rotor disk, two brushes also mounted on the base for collecting generated electrical charges from the rotor disk and making them available to a load circuit, each of said brushes mounted adjacent to one of the pads in reversed position and each comprising a conductor in resilient contact with the rotor disk, electrical connecting means for joining each brush to its adjacent pad, and means for turning the rotor in either direction to provide electrical potentials at the brushes, the polarity of which depends upon the direction of rotation of the rotor.

7. A friction generator comprising, a rotor made of an inert hydrocarbon plastic, two pads of fibrous material coated with mercury amalgam resiliently pressed into contact with the rotor, two brushes for collecting generated electrical charges from the rotor, each of said brushes mounted adjacent to one of the pads in reversed position and each comprising a conductor in contact with the rotor and in contact with the adjacent pad, and means for turning the rotor in either direction.

8. A friction generator comprising, a rotor made of glass, two pads of fibrous material coated with mercury amalgam resiliently pressed into contact with the rotor, two brushes for collecting generated electrical charges from the rotor, a pair of output terminals with electrical connections to the brushes for making generated charges available to an external circuit, each of said brushes mounted adjacent to one of the pads in reversed position and each comprising a conductor in contact with the rotor and having an electrical connection to its adjacent pad, and means for turning the rotor in either direction.

WILBER L. MEIER.

No references cited.